Aug. 6, 1963     M. G. HUNTINGTON     3,100,146
METHOD AND APPARATUS FOR THE CONDENSATION, AGGLOMERATION,
FILTRATION AND ABSORPTION OF THE EXHAUST GASES
FROM INTERNAL COMBUSTION ENGINES
Filed Sept. 20, 1960
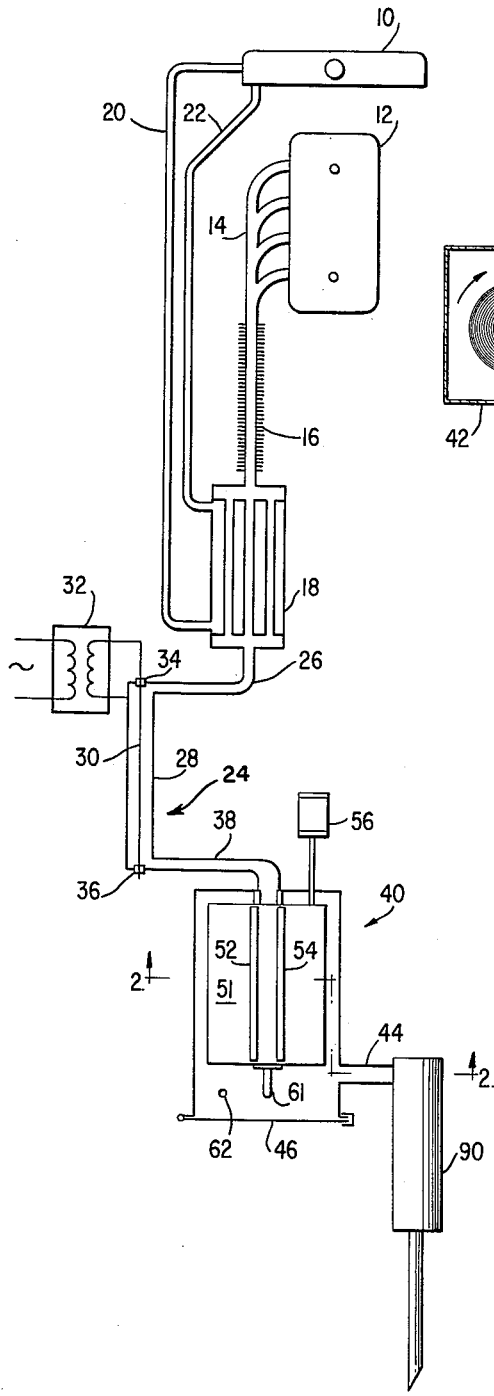
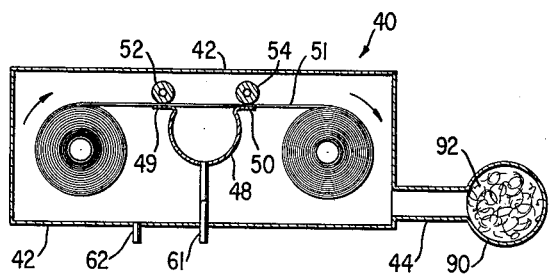
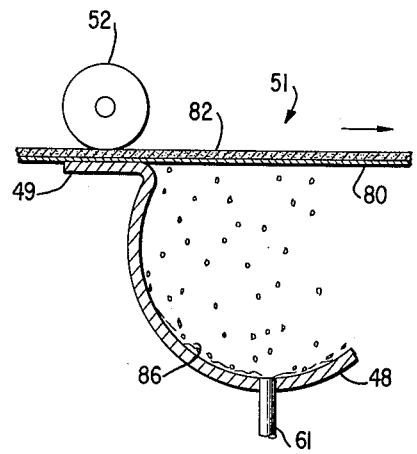
INVENTOR.
MORGAN G. HUNTINGTON
BY
ATTORNEYS

3,100,146
Patented Aug. 6, 1963

3,100,146
METHOD AND APPARATUS FOR THE CONDENSATION, AGGLOMERATION, FILTRATION AND ABSORPTION OF THE EXHAUST GASES FROM INTERNAL COMBUSTION ENGINES
Morgan G. Huntington, Salt Lake City, Utah, assignor to Huntington Chemical Corporation
Filed Sept. 20, 1960, Ser. No. 57,258
6 Claims. (Cl. 55—9)

This invention relates to improvements in the cleaning of exhaust gases of internal combustion engines. More particularly, the invention relates to a method and apparatus for condensation, agglomeration by electrostatic confusion, and filtration with subsequent absorptions of objectionable components contained in the exhaust gases exiting from internal combustion engines such as are used to power auotmobiles, trucks and the like.

Visible smog is a major problem in certain areas of the United States and the problem is rapidly getting worse instead of better. Smog is, in fact, so unpleasant and undesirable that certain areas of the United States have enacted laws requiring various measures to be taken to reduce or eliminate certain of the causative factors of smog.

On American highways today, there are some fifty million vehicles powered by internal combustion engines which exhaust from 50 to 600 standard cubic feet of gases a minute. These gases contain products of combustion as well as substantial quantities of partially burned and oxygenated hydrocarbons as well as fixed nitrogen appearing as nitrogen oxides. Largely responsible for the visible "smog" are the entrained particles of finely-divided carbon, anti-knock gasoline additives, minute droplets (dispersoids) of entrained lubricants, various types of unburned hydrocarbon compounds and a whole series oxygenated aliphatic compounds, many of which cause serious eye irritation and some are believed by some people to cause the growth of cancer in human beings.

As exhaust gases leave an engine in which the internal flame temperature of the cylinders may momentarily reach 4000° F., except for elemental carbon anti-knock additives, the unburned fuel, lubricants and oxygenated compounds are necessarily in the vapor phase and the exhaust gases must be cooled to the point of condensation of these vapors before any kind of physical separation may be effected.

Following the lowering of the temperature to the point where condensation of vapors takes place, the dispersoids of liquid are at first so minute as to defy filtration, impingement or centrifuging. Likewise, for the most part the carbon particles and anti-knock additives which result from the partial combustion of most motor fuels are almost molecular in size.

Electric precipitation of the tubular and plate types will effect precipitation of dispersoids of this kind, but the low volumetric capacity and the cost of maintenance and operation of electric precipitators renders them impractical in mobile equipment.

To overcome the entrained condensate size problem and to cause all dispersoids to coalesce by confusion of electrostatic particle charge and to become amendable to filtration by moderately coarse grained filter media, such as filter paper, is fundamental to the exhaust gas cleaning concept of this invention. Also fundamental is the absorption of nitrogen oxides on a suitable absorption medium following the removal of solid and liquid dispersoids and precipitation of most of the water in the exhaust.

Tetraethyl lead (T.E.L.) anti-knock compound is added to most gasolines to the extent of some five hundred million pounds annually. In order that leaded deposits do not form within the engine combustion chambers, halide scavengers are also added to form lead chlorobromides. Thus, the major automotive exhaust products from tetraethyl lead and its companion scavengers form particulate solids or dispersoids which contribute materially to the visible smog components. This very finely-divided, solid material amounting to hundreds of thousands of tons annually can be effectively removed from automotive exhaust only by agglomeration and filtration. This invention provides for removal from automotive exhaust gases of the solid atmospheric pollutants formed by the combustion of tetraethyl lead and other such gasoline additives.

During the combustion of fuels in automotive and other internal combustion engines some of the nitrogen of the atmosphere combines with some of the oxygen to form nitric oxide gas. Upon being exhausted from the engine into the atmosphere, nitric oxide rapidly forms nitrogen dioxide, the anhydride of nitric acid. Nitrogen dioxide by action of sunlight splits into nitric oxide and atomic oxygen which promptly forms the very active oxidant, ozone. Ozone plus the two oxides of nitrogen comprise the most active oxidants in the smog bound areas of the United States. In certain regions these virulent and poisonous oxidants are frequently present to the extent of more than 40 parts per hundred million parts of the atmosphere. These oxidants and the reactions which they promote appear to be closely related to the unstable smog components which are chiefly responsible for eye irritation and for wide spread plant damage.

This invention provides for the reduction of the nitric oxide content of automotive exhaust by absorption with a disposal filter medium treated with silicate gel and/or with other suitable absorbents.

The objects of this invention are to cool engine exhaust gases to a point where condensation of practically all hydrocarbons, water and most oxygenated compounds take place; and to subsequently cause the agglomeration without precipitation of both liquid and solid dispersoids to a point where high filtration and precipitation of the water may be obtained; and then to precipitate the water and filter out of the gas stream such agglomerated dispersoids, while subsequently absorbing the nitric oxide of the exhaust.

It is another object of this invention to provide a ready and simple means of filter and absorbed media replacement and disposal to be accomplished in a few minutes at any automobile service station.

It is an additional object of this invention to provide a system of cooling, agglomerating, filtering and absorbing exhaust gases wherein the pressure drop of the entire system is not high enough to impair the efficient operation of the internal combustion engine.

It is a further object of this invention to provide a highly efficient exhaust cleaning system which can be fabricated and installed on engine exhaust for a low cost.

Further objects of this invention will be pointed out in the following detailed description and claims and illustrated in the accompanying drawings which disclose, by way of example, the principle of this invention and the best mode which has been contemplated of applying the principle.

In the drawings:

FIGURE 1 represents a partially schematic view of the apparatus for exhaust cleaning constituting the preferred embodiment of this invention.

FIGURE 2 is a sectional view taken along line 2—2 of FIGURE 1.

FIGURE 3 is an enlarged view of the water impinging filtering and absorbing medium.

In general this invention provides for exhaust cleaning by first cooling engine exhaust gases. For preliminary cooling purposes an exhaust pipe is provided with external fins and/or a water jacketed heat exchanger may be provided to bring the temperature of the exhaust gases below the point at which most of the unburned vapors are condensed. Following the cooling of the gases and the condensing of the vapors, the gases and entrained dispersoids both solid and liquid are passed through one or more parallel electric confusor tubes to agglomerate the dispersoids without precipitation within the tubes Following the cooling of the gases and the agglomeration of dispersoids, the gases and entrained materials are passed through a disposable water impinging and filtering medium to precipitate the agglomerated liquid droplets and filter the agglomerated solids. Then the nitrogen oxides of the exhaust are absorbed by suitable absorbents in a disposable cartridge.

Referring to the drawings, a conventional water-cooled internal combustion engine 12 such as commonly found in automobiles, trucks, stationary installations and the like, includes a radiator 10 for supplying water coolant to the engine, and an exhaust manifold 14. Only the elements of engine 12 necessary for an understanding of this invention have been shown and these are only shown schematically to enable an understanding of this invention.

The exhaust manifold 14 is provided with a finned extension 16 to provide air cooling of the exhaust gases. In series with the air cooled exhaust pipe 16 may be a water or liquid cooled heat exchanger 18 having tubular connections 20 and 22 connected to the cooling system of the internal combustion engine 12 such as to radiator 10, or to other suitable heat rejection system. The air cooler 16 and water cooled heat exchanger 18 are for the purpose of reducing the temperature of the exhaust gases in order to condense most of the unburned fuel, water and oxygenated compounds. It is contemplated that the temperature of the exhaust gases will be reduced to below 200° F. and as such would condense most of the water vapor in the gases. Of course, exhaust gas temperatures vary with speed and load, high loads and speed causing the highest temperatures. Also, since the temperature of the ambient air varies quite widely, air cooling alone would probably be too erratic for efficient operation and for this reason the additional liquid cooler 18 is added behind the air cooler 16. In certain installations for localities where the ambient air will be sufficiently cool and where other conditions are always favorable, only air cooling means may be provided if the exhaust gas temperatures can be satisfactorily reduced by using such cooling means.

A dispersoid confusor or agglomerator indicated generally at 24 is connected to the exit of the heat exchanger 18 by conduit 26. For large engines there may be a plurality of agglomerators 24 arranged in parallel. The agglomerator or dispersoid confusor 24 consists of an outside tubular member 28 and a central conductive wire 30 insulated from and passing through the center of the tubular member 28. These elements are connected by electrical conductors to a transformer or the like adapted to supply 60 to 5000 or more cycles per second alternating current at approximately 15,000 volts. The transformer 32 may be fed from a suitable source of low voltage alternating current such as by a vibrator operated from an automobile storage battery. The wire 30 must be insulated from its support by suitable insulators 34 and 36. Obviously, the insulators 34 and 36 must be at all times above the condensation temperature of water vapor in order that short circuiting will not occur. For such reason a thermostatically controlled electric resistance heater may be imbedded in the insulators.

The purpose of the confusor or agglomerator tube 24 is to confuse the dispersoids and agglomerate them so that they will be of filterable size. It is noted that no precipitation takes place within the agglomerator 24. The condensed and agglomerated particles within the exhaust gas pass from agglomerator 24 through tubular member 38 into a filter 40.

Filter 40 includes a gas-tight shroud 42 with an exit duct 44 and a quick opening access door 46 which may be hinged, clamped or the like. The exhaust gases pass through an opening in the gas-tight shroud and down into a dead end filter inlet open channel duct 48 which extends for substantially the length of the shroud. The duct 48 has a pair of wings 49 and 50 extending outwardly and the top of open channel duct 48 is covered by a water impinging and filter medium 51. A pair of pressure rollers 52 and 54 are adapted to be spring biased by spring means, not shown, to press the filter medium 51 against the wings 49 and 50 of duct 48 in order to assure that all the exhaust gases exiting from channel 48 pass through the filter medium 51 prior to exiting out exit 44.

The filter medium 51 is driven in a slow, intermittent step-by-step manner in order to present new filter surface as required to hold the pressure drop to a satisfactorily low level. The drive is by means of a suitable motor 56 or the like which step drives a length of filter medium equal to the width of channel 48. After the filter medium accumulates on the driven roll in a suitable period of time, the door 46 can be opened and the used filter medium removed and a new roll of filter medium added. The area of the filter paper to which the exhaust gases pass combined with the consistency of the filter medium is such that the pressure drop through the medium is not significant with regard to the efficiency of the internal combustion engine. If greater filter area is required, a plurality of filters 40 may be provided in parallel.

As shown in FIGURE 3 the filter medium 51 is in at least two layers. The lower layer 80 is an impinging medium of non-absorbent material for causing the impinging water droplets to coalesce and rain down into channel 86. The upper layer 82 is a small solids filtering medium adapted to filter out the agglomerated solid particles and the remaining liquid particles.

Then the exhaust gases exit from filter 40 through duct 44 to an absorbent means including a disposable cartridge 90 with silica gel coated glass fibers 92 or other suitable absorbing medium and support. The cartridge 90 and filler 92 act as an absorbing medium for the nitrogen oxides in the exhaust gases. After such treatment the clean gases then exhaust to atmosphere.

By cooling the exhaust gases and reducing the absolute volume the need for a separate sound deadening muffler in this system is eliminated, thus the cost of the system can be calculated after deducting the cost of a conventional muffler. It is contemplated that all of the elements can be easily fabricated or readily purchased to provide a low cost system available to all motorists.

The operation of the system will now be described: When the internal combustion engine 12 is operated, the exhaust gases will pass through exhaust gas manifold 14 at a temperature depending on the load and/or speed of the engine and probably somewhere in the neighborhood of 600–1000 or 1200° F. for an Otto cycle engine. Ambient air contacting fins 16 attached to the exhaust pipe partially cools the exhaust gases and as they pass into tubular liquid heat exchanger 18 where they are further cooled by heat exchange with liquid passing into and out of heat exchanger 18 through pipes 20 and 22.

The exhaust gases leaving heat exchanger 18 will be cooled sufficiently to condense practically all the unburned fuel and oxygenated compounds as well as most of the water vapor and then will pass to the agglomerator 24. The insulators 34 and 36 have been heated sufficiently to prevent any breakdown across the insulators due to wetting by water and the high voltage A.C. is fed to the tube 28 and wire 30 and by reason of its being alternating current rather than direct current will confuse the dispersoids passing through tube 28 causing them to agglomerate and coalesce but not to precipitate.

The agglomerated condensed and coalesced particles then pass through tube 38 into channel duct 48 and then must pass through the impinging and filter medium 51 held on channel 48 by pressure rollers 52 and 54. With the condensed coalesced and agglomerated dispersoids filtered out, the exhaust gases pass the absorbent cartridge 90 for absorbing nitrogen oxides and other absorbable gases and then the clean gases pass on to the atmosphere through the exhaust exit duct. Liquid drains for the system are shown at 61 and 62 and all of the components are arranged so as to be self-draining of liquids through similar suitable ducts. The ducts will be small enough to prevent unfiltered exhaust gases from leaking therethrough in quantity or they could be metered or controlled by suitable known devices.

The capacity of the roll of filter medium is such that it need be changed only at convenient service stops and could probably hold several pounds of smog producing dispersoids before the need for a change. At the usual service station stop the quick access door 48 is opened, the roll with the cumulative smog producing dispersoid is removed and a clean roll of filter medium is replaced in the device. At the same time disposable cartridge 90 can be removed and replaced.

It is recognized that this invention provides a means for removing most of the visible smog producing particles and a considerable fraction of the eye irritating compounds from exhaust gases. However, some of the smog producing effluence from internal combustion engines comes from crankcase vapors which are usually vented and to further enhance smog reducing operation, the crankcase vapors should be taken care of by drawing them into a carburetor such as is known in a large number of previously patented inventions. Further, as a means of reducing the eye irritating components from engine exhaust gases it is recommended that crude oils be desulfurized to a point where the total sulfur content is less than 0.05 percent by weight prior to processing into gasoline and diesel fuel.

While there has been shown and described and pointed out the fundamental novel features of the invention as applied to a preferred embodiment, it will be understood that various omissions and substitutions and changes in form and detail of the device illustrated and in its operation may be made by those skilled in the art without departing from the spirit of the invention. It is the intention, therefore, to be limited only as indicated by the scope of the following claims.

What is claimed is:

1. A method of cleaning exhaust gases exiting from internal combustion engines that comprises; cooling the exhaust gases to a temperature low enough for condensing most of the unburned fuel and other vapors in the gases, then confusing dispersoids in the exhaust gases by agglomerating them by high potential alternating current electric means without precipitation, passing the confused coalesced and agglomerated dispersoids to a filter means, filtering smog producing dispersoids from the exhaust gases by renewable filter paper, and subsequently absorbing nitrogen oxides by a disposable cartridge containing an absorbent for nitrogen oxides.

2. A method of cleaning exhaust gases that comprises; firts cooling said gases to a temperature below the temperature at which most of the unburned vapors and water are condensed, passing said cooled gases to an electric confusor, confusing the small liquid and solid particles by applying a pulsating high potential thereto and thereby coalescing and agglomerating them without precipitation, passing the confused coalesced and agglomerated particles to a renewable impingement and filter means, precipitating the coalesced liquid droplets and filtering the agglomerated solids on the renewable impingement and filter means, and then absorbing the nitrogen oxides in the remaining exhaust by absorbents therefor in a disposable cartridge.

3. An apparatus for cleaning exhaust gases exiting from internal combustion engines, the apparatus comprising; a finned tube exhaust pipe for preliminary cooling said exhaust gases, a liquid heat exchanger in fluid communication with said exhaust pipe for further cooling said exhaust gases to bring the temperature thereof down to a point at which most of the unburned fuel, lubricant vapors and moisture are condensed, a cooling system for circulating the liquid coolant of said heat exchanger through the engine cooling system, electric precipitator means of the tubular type in fluid communication and in series with said heat exchangers, means for applying an alternating current of high voltage to said precipitator to confuse and agglomerate the small liquid and solid particles in the exhaust gases passing therethrough without precipitation of said particles, and a filter in fluid communication and in series with said precipitator, said filter including a renewable filter medium for precipitating the liquids and filtering out the agglomerated solids from said exhaust gases, and conduit means for passing the exhaust gases from the outlet side of the filter to atmosphere.

4. An apparatus as defined in claim 3 further comprising a renewable and disposable filter cartridge in said exhaust conduit leading to said atmosphere from said filter, said filter cartridge containing silica gel for absorbing nitrogen oxides from said exhaust gases.

5. A device as defined in claim 4 wherein said filter medium is composed of at least two separate contiguous layers, the layer first in contact with the exhaust gases being constructed to precipitate the moisture and the next layer adapted to absorb the agglomerated solids in the exhaust gas, and means for driving the filter medium to filtering position in a step-by-step manner to replace an entire section of filter paper at one time.

6. A method of cleaning exhaust gases of the type exhausted from internal combustion engines, the method comprising, cooling the exhaust gases by finned tube and liquid jacketed heat exchangers, circulating liquid coolant to said finned tube and liquid jacketed heat exchangers through the engine coolant system, passing the cooled exhaust gases having the unburned fuel, water, and other vapors therein mostly condensed to a tubular electric precipitator, applying a high voltage alternating current to said precipitator and thereby confusing, coalescing, and agglomerating the small solid and liquid particles in the gases so as to make said particles larger in size, passing said gases to a filter medium, then precipitating out the moisture on a portion of the filter medium and filtering out the solid particles on another portion of the filter medium, renewing the filter medium in a step-by-step manner after it becomes sufficiently clogged with filtered particles, passing the exhaust gases having the solids and condensed liquids precipitated and filtered therefrom through an absorbing medium for absorbing nitrogen oxides from said cooled and filtered gases, and subsequently passing said cleaned gases to the atmosphere.

References Cited in the file of this patent

UNITED STATES PATENTS

| | | |
|---|---|---|
| 825,923 | Monahan | July 17, 1906 |
| 1,416,769 | Wolcott | May 23, 1922 |
| 1,825,377 | Watts | Sept. 29, 1931 |
| 1,866,659 | Litle | July 12, 1932 |
| 2,678,616 | Kay | May 18, 1954 |
| 2,787,119 | Giambruno | Apr. 2, 1957 |
| 2,795,288 | Hirs | June 11, 1957 |
| 2,869,680 | Fields | Jan. 20, 1959 |
| 2,975,586 | Bray | Mar. 21, 1961 |
| 2,983,332 | Vicard | May 9, 1961 |